United States Patent [19]
Satoh et al.

[11] Patent Number: 5,014,832
[45] Date of Patent: May 14, 1991

[54] CLUTCH CONTROL SYSTEM

[75] Inventors: Yuji Satoh; Hiromi Kono; Hiroyuki Soda; Masuhiro Otsuka, all of Saitama, Japan

[73] Assignee: Zexel Corporation, Tokyo, Japan

[21] Appl. No.: 587,353

[22] Filed: Sep. 24, 1990

[30] Foreign Application Priority Data

Sep. 26, 1989 [JP] Japan .................. 1-112622[U]

[51] Int. Cl.$^5$ .................. F16D 25/14; F16D 43/00
[52] U.S. Cl. .................. 192/30 W; 192/33; 192/103 F; 364/424.1
[58] Field of Search .................. 192/30 W, 33, 103 F; 364/151, 424.1

[56] References Cited

U.S. PATENT DOCUMENTS 4,361,060 11/1982 Smyth .................. 364/424.1 X
4,629,045 12/1986 Kasai et al. .................. 192/52
4,722,426 2/1988 Bellanger .................. 192/103 F X Primary Examiner—Rodney H. Bonick
Attorney, Agent, or Firm—Kanesaka & Takeuchi

[57] ABSTRACT

A clutch control unit which includes a clutch (6); a first detector (9) for detecting a first rate of rotation of an input of the clutch; a second detector (5a) for detecting a second rate of rotation of an output of the clutch; a clutch learning unit (4b) for determining a clutch position at which both of the first and second rates of rotation meet predetermined conditions when said clutch is moved toward engagement from a preset learning starting point and storing a clutch characteristic; a signal generator (4c) for generating a learning underway signal indicating that the clutch learning unit is learning the clutch characteristic; and warning unit (16a) responsive to the learning underway signal to provide a warning display or sound.

5 Claims, 4 Drawing Sheets

F ; HALF CLUTCH POINT
P ; CLUTCH COMPLETION POINT
Q ; CLUTCH STARTING POINT
S ; LEARNING START POINT
M ; CLUTCH CHARACTERISTIC (a)

(b)

CLUTCH CONTROL SYSTEM

BACKGROUND OF THE INVENTION

1. Field of the Invention

The present invention relates generally to clutch control units for vehicles and, more particularly, to a clutch control unit for automatically engaging and disengaging the clutch by learning.

2. Description of the Prior Art

FIG. 3 shows an automatic transmission using a conventional clutch control unit of this type. A well-known parallel axis gear type transmission 1 is controlled by a transmission actuator 2 which consists of a select actuator 2a and a shift actuator 2b. Each of these actuators 2a and 2b is controlled under a hydraulic pressure of a hydraulic drive unit 3 which consists of a tank 3a, a pump 3b, an accumulator 3c, and a hydraulic pressure switching electromagnetic valve (not shown) to shift a driving gear of the transmission 1 via a piston rod 2c or 2d. This control is made by the central processing unit (CPU) of a transmission drive unit 2e, which in turn is controlled by a main control unit 4 which consists of a CPU, a random access memory (RAM) and a read only memory (ROM) through serial communications.

A pair of potentiometers 2f and 2g are provided to detect the positions of the piston rods 2c and 2d, respectively, for controlling the gear position. More specifically, the actual position signals from the respective potentiometers 2f and 2g are fed back to the drive unit 2e so that they match the target position signals from the main control unit 4. An input shaft sensor 5a detects the rate of rotation v of an input shaft 1a of the transmission 1, and a vehicle speed sensor 5b detects the vehicle speed or rate of rotation V' of an output shaft of the transmission 1. The output of each of these sensors 5a and 5b is inputted to the main control unit 4.

A clutch 6 is linked to the piston rod 7a of a clutch actuator 7 for making connection or disconnection. The clutch actuator 7 is supplied with a hydraulic pressure from the hydraulic drive system 3 and subjected to a feedback control by the CPU of a clutch drive unit 7b so that the position signal of the piston rod 7a detected by the potentiometer 7c matches the target position signal from the main control unit 4. The clutch drive unit 7b is also controlled by the main control unit 4 through serial communications. An engine 8 has a control unit 8a controlled by the main control unit 4. An engine speed sensor 9 detects the rate of rotation V of an output shaft 8b of the engine 8. The rotation of the engine 8 is transmitted to an axle 10 via the clutch 6 and the transmission 1.

The output of the engine speed sensor 9 is inputted to the main control unit 4, to which more signals are inputted from an accelerator pedal sensor 11, a brake pedal sensor 12, a key switch 13, an exhaust brake switch 14, and a selector 15 to control the drive unit 2e, the clutch drive unit 7b, the engine control 8a, a display panel 16, and a control unit 17a which controls a gear position display panel 17. Thus, the main control unit 4 controls the clutch 6 and the transmission 1 according to the amount of pressdown of the accelerator pedal, the vehicle speed, and the shift position of the selector 15. The gear position is controlled by the select actuator 2a and the shift actuator 2b in response to the operation of the selector 15. If the set position is "1", "2", "3", or "R", it is controlled into the first, second, third, or reverse gear. If the set position is an automatic gear shift "4" or "5", it is controlled based on the gear shift map according to the amount of pressdown of the accelerator pedal and the vehicle speed. The automatic gear shifts "4" and "5" provide gear shifts between the first and the fourth gear and the second and the fifth gear, respectively.

The clutch 6 is disengaged and engaged by the main control unit 4 via the clutch drive unit 7b and the clutch actuator 7 before and after the gear shift operation. This control is made according to the clutch characteristic which is obtained by a learning activity under predetermined conditions. This learning activity will be described with reference to FIG. 4. A learning starting point S has been stored in the memory of the main control unit 4. When predetermined conditions, such as the gear is set in the neutral, are met, the activity starts from the learning starting point S toward engagement of the clutch 6 to determined a half clutch point F based on the rates of rotation V and v detected by the engine speed sensor 9 and the input shaft sensor 5a. Then, the clutch starting point Q and the clutch completion point P are determined by taking predetermined offset lengths (operational distances) $l_1$ and $l_2$ toward the disengagement and engagement condition, respectively, from the half clutch point F. From the half clutch point F, the clutch starting point Q, and the clutch completion point P, a clutch characteristic M is constructed and stored in the memory. In the next learning cycle, the previous clutch starting point Q is taken as a new learning starting point S to perform a learning activity. The engagement and disengagement of the clutch 6 are controlled according to the clutch characteristic M to reduce the operational stroke of the clutch 6, thereby not only speeding up the gear shift but also providing the optimal clutch control taking the wear of the clutch 6 into consideration.

In the above conventional clutch control unit, only a single half clutch point is determined by learning, but the Japanese Patent Application Kokai No. 60-34525 has proposed that two points—a clutch completion point and a engagement starting point—are determined by learning.

As has been described above, in a vehicle equipped with the automatic transmission unit using a dry type clutch, a learning activity at the clutch meet point is necessary. However, it takes a few seconds for the whole learning activity including the determination of only a half clutch point so that if the driver moves the selector before the learning activity is completed, the learning activity is interrupted and failed.

SUMMARY OF THE INVENTION

Accordingly, it is an object of the present invention to provide a clutch control unit which is able to warns the driver to permit the learning activity to complete.

According to the invention there is provided a clutch control unit which includes a clutch; a first detector for detecting a first rate of rotation of an input of the clutch; a second detector for detecting a second rate of rotation of an output of the clutch; a clutch learning unit for determining a clutch position at which both of the first and second rates of rotation meet predetermined conditions when said clutch is moved toward engagement from a preset learning starting point and storing a clutch characteristic; a signal generator for generating a learning underway signal indicating that the clutch learning means is learning the clutch characteristic; and a warning unit responsive to the learning underway signal to provide a warning display or sound.

The clutch learning unit according to the invention generates a signal indicating that the clutch learning unit is under a learning activity or completes the learning activity so that the driver is able to learn that the clutch learning activity is under way or completed, thereby refraining himself from moving the selector or other operations which interrupt the learning activity until the learning activity is completed.

The above and other objects, features, and advantages of the invention will become more apparent from the following description when taken in conjunction with the accompanying drawings.

DESCRIPTION OF THE PREFERRED EMBODIMENT

Figure 1:
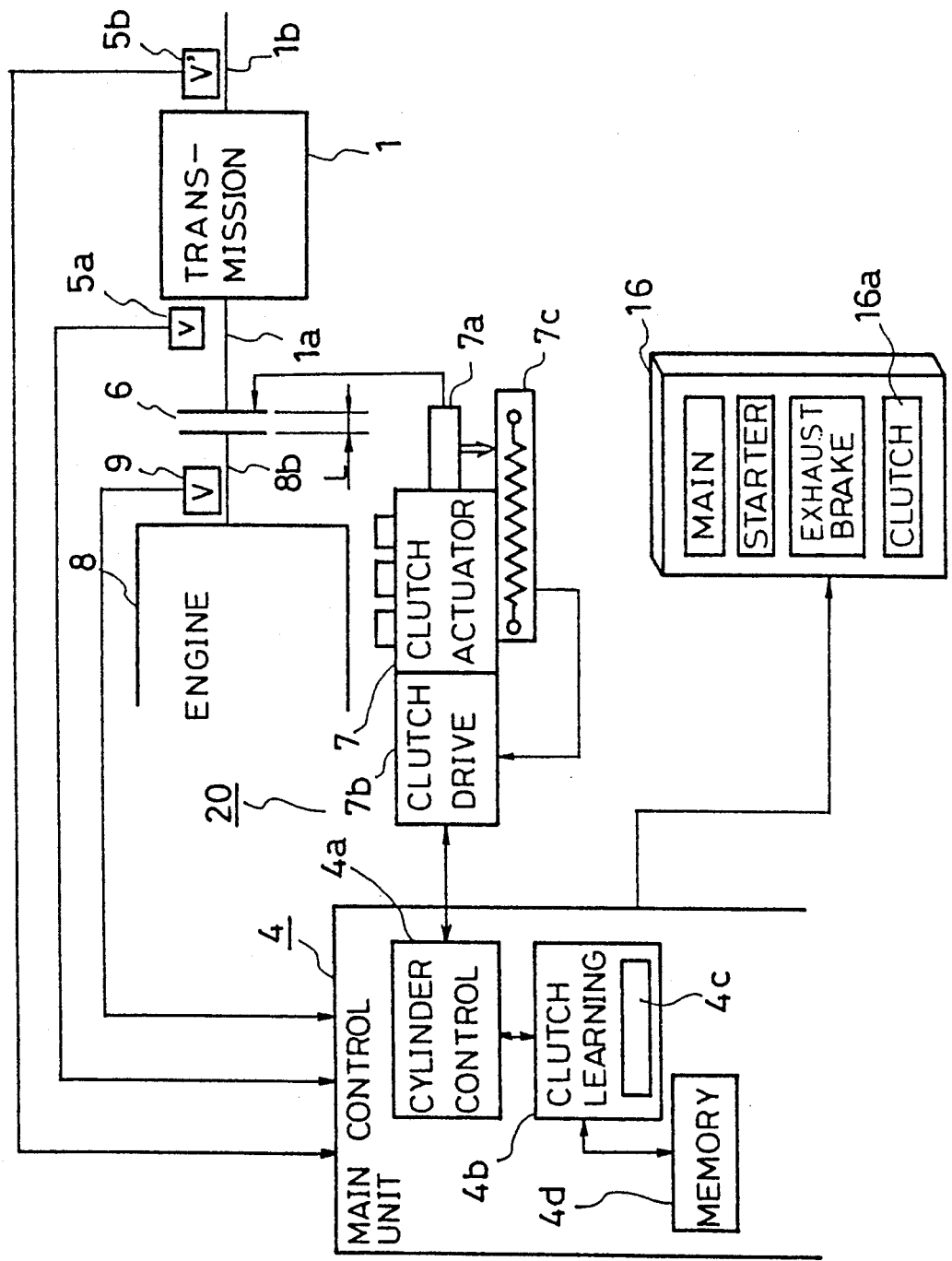
FIG. 1 is a schematic diagram of a clutch control unit according to an embodiment of the invention.
Figure 3:
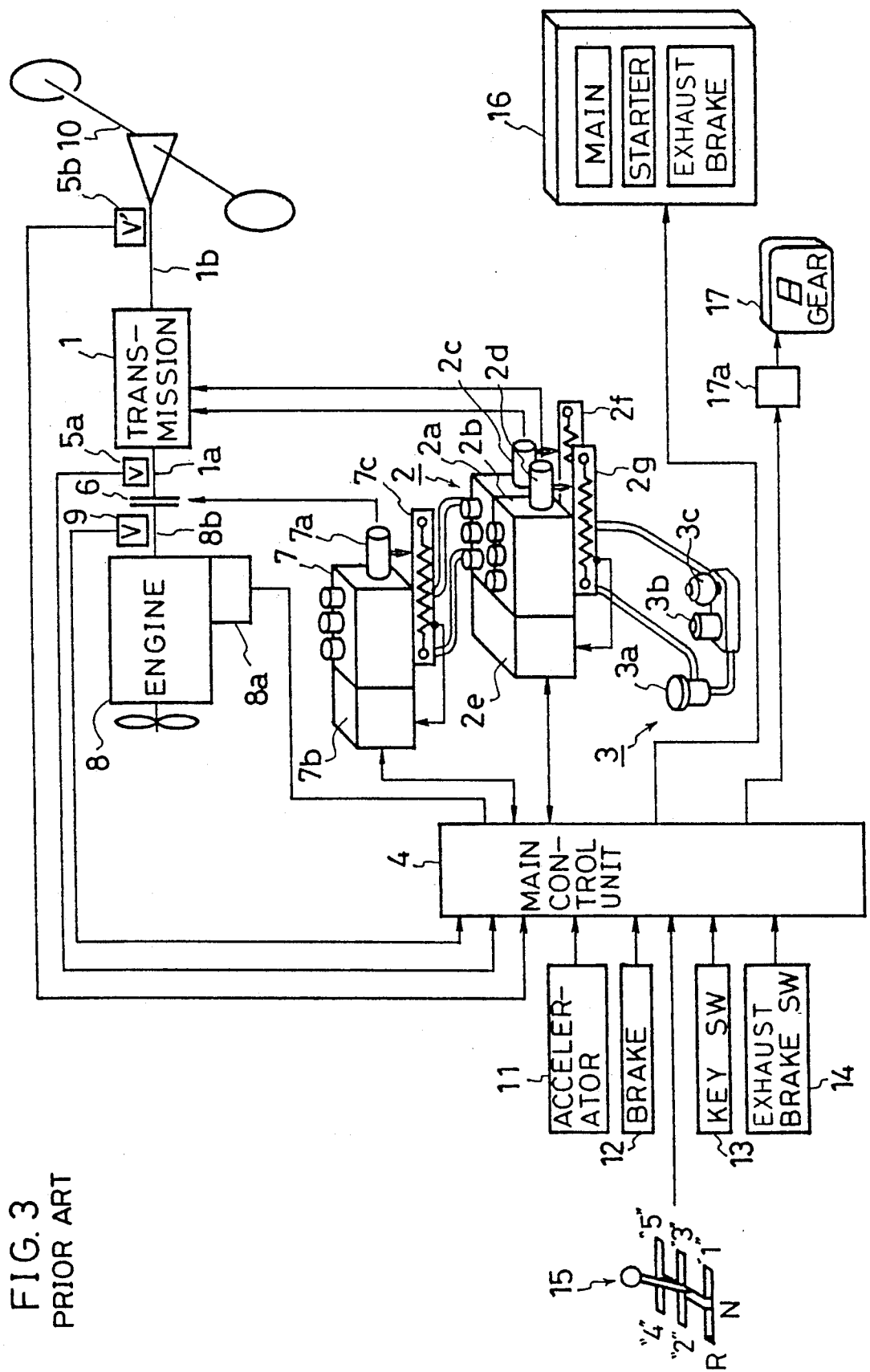
FIG. 3 is a schematic diagram of an automatic transmission using a conventional clutch control unit.
Figure 4:
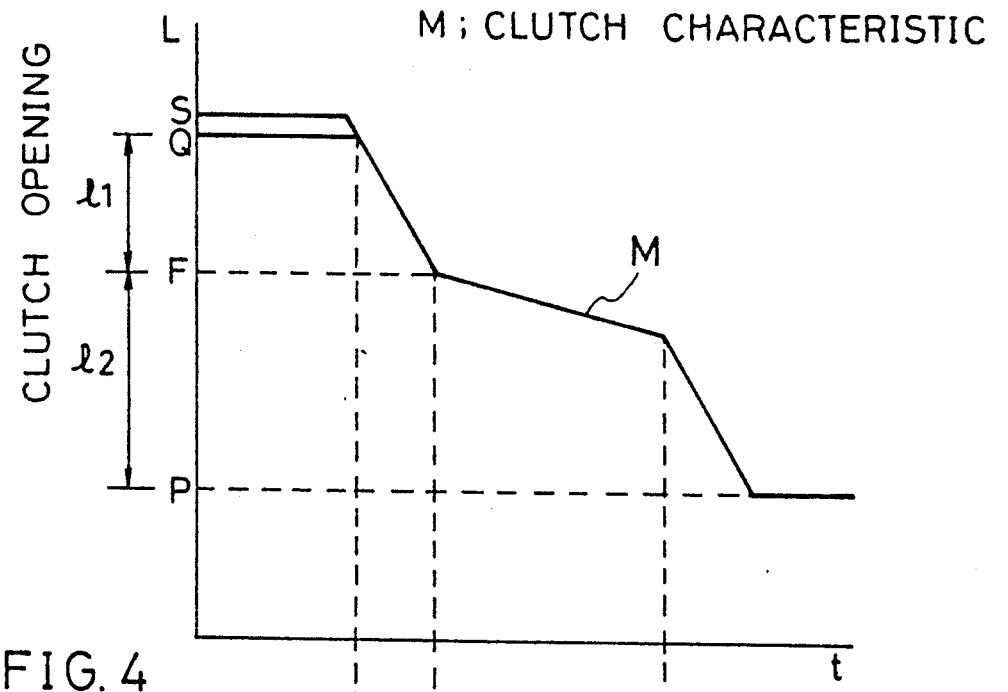
FIG. 4a and FIG. 4b are diagrams useful for explaining a learning activity.
Figure 4:
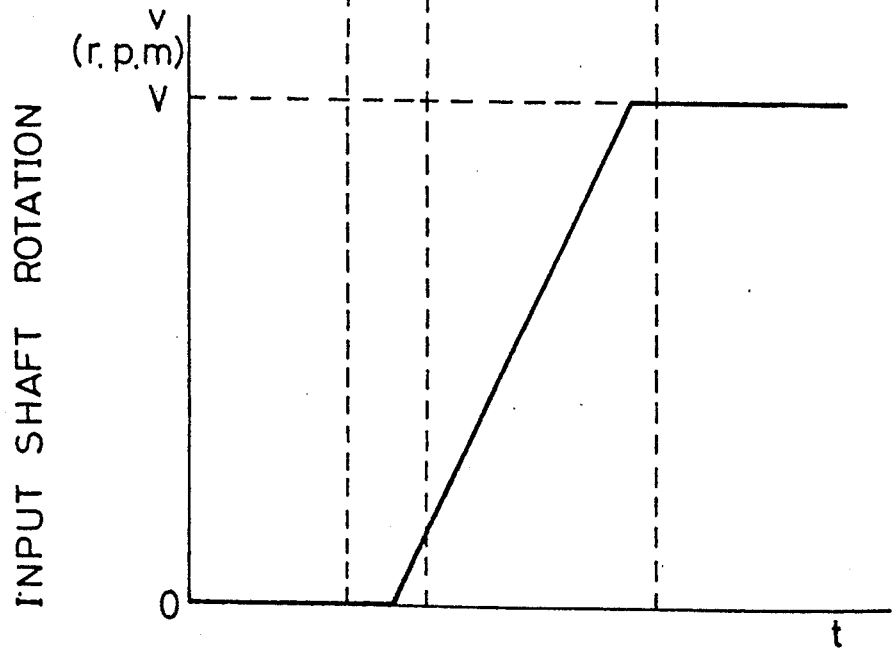

In FIG. 1, like reference characters denote like or corresponding parts or components of FIG. 3. A cylinder control unit 4a controls the hydraulic drive system via the drive unit 7b for controlling the cylinder within the clutch actuator 7. The cylinder control unit 4a, the drive unit 7b, and the clutch actuator 7 constitute a clutch control unit 20. A clutch learning unit 4b starts a learning activity when predetermined conditions are met and controls the cylinder control unit 4a according to the clutch characteristic which is obtained by learning in disengaging and engaging the clutch 6. This clutch learning unit 4b has a generator circuit 4c for generating a warning signal for informing that the learning activity is under way or completed. With this warning signal, the clutch learning light 16a of a display panel 16 is turned on and off. The clutch characteristic is stored in the memory 4d. The cylinder control unit 4a, the clutch learning unit 4b, and the memory 4d are implemented by the CPU, ROM, and RAM of the control unit 4. The engine speed sensor 9, the input shaft sensor 5a, the generator circuit 4c, and the clutch learning light 16a correspond to the first detector, the second detector, the generator means, and the warning means, respectively, in the appended claims.

Figure 2:
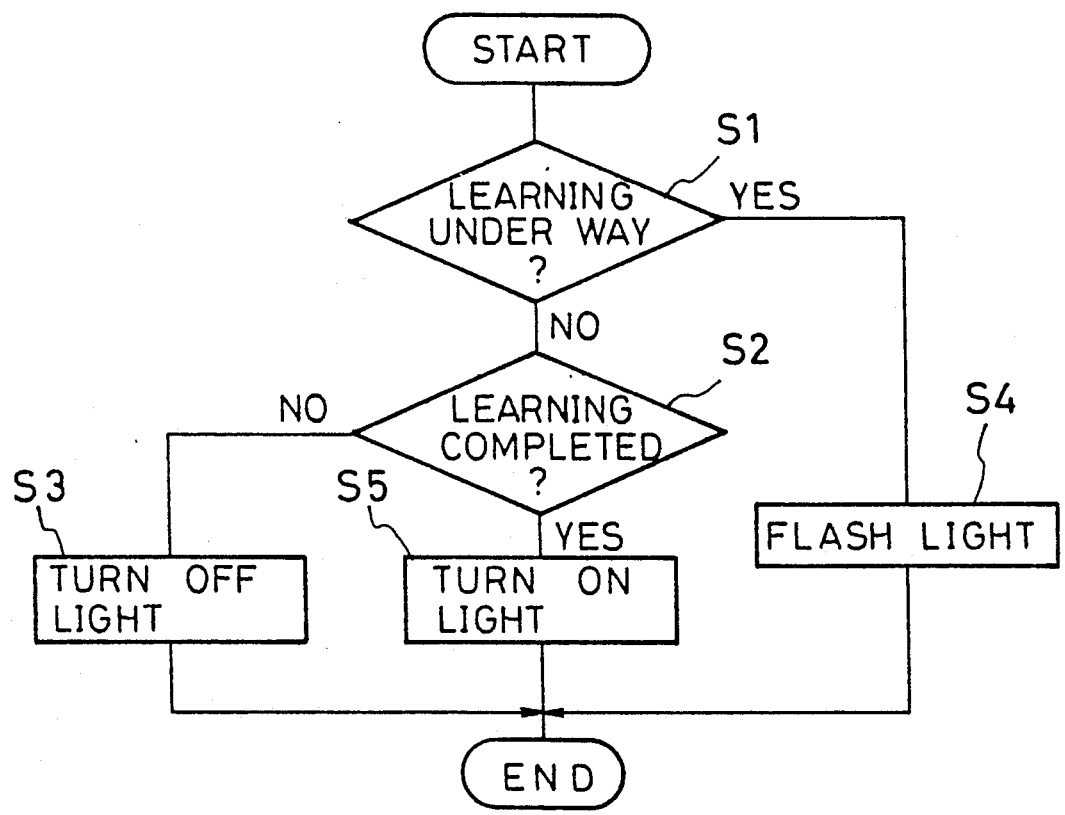
FIG. 2 is a flow chart useful for explaining how the clutch control unit works.

The operation of the clutch control unit will be described with reference to FIG. 2. When the driver inserts the ignition key, the learning activity does not start so that the generator circuit 4c does not generate any warning signal, keeping the clutch learning light 16a off. This off condition warns the driver to start a clutch learning activity. Seeing that the light 16a is off, the driver learns that the learning activity is not completed and disengages the clutch to set the gear in the neutral. When the engine is run, with the gear in the neutral, the clutch learning unit 4b starts a learning activity. When the learning activity starts, the control moves from Step S1 to Step S4 in which the generator circuit 4c generates a warning signal for turning on and off the clutch learning light 16a. This flashing light 16a warns the driver that the clutch learning activity is under way and the driver waits for the completion of the learning activity while refraining himself from making a gear shift which interrupts the learning activity. When the learning activity for disengaging and engaging the clutch is completed a few seconds after the learning starting point, the control advances from Step S2 to Step S5 in which the generator circuit 4c generates a learning completion signal for turning on the clutch learning light 16a. Since the light 16a changes from the flashing to on condition, the driver learns that the learning activity is completed and advances to the next operation such as a gear shift operation.

The clutch characteristic obtained from the above learning activity is stored in the memory 4d and used as data for automatic control of the clutch 6 by the cylinder control unit 4a or the next learning activity. Thereafter, whenever the learning conditions are met, the control advances from Step S1 to Step S4 in which the clutch learning light 16a flashes. When the learning activity is completed, the control advances from Step S1 to Step S2 and S5 in which the light 16a is kept on. This is repeated until the ignition key is turned off. If the learning activity is interrupted by making a gear shift, for instance, while the learning light 16a flashes in the period between turning on of the ignition key and completion of the first learning activity, the control advances from Step S1 to S2 and S3 in which the light 16a is turned off, which warns the driver to complete the learning activity.

In the above embodiment, only a single half clutch point is determined by learning, but two points—a clutch complete point and a engagement starting point—may be determined as Japanese Patent Application Kokai No. 60-34525 has taught. The flashing and on light indicate that the learning activity is under way and completed, respectively, but the use of only one of them may be sufficient. The display pattern consisting of "off", "flash," and "on" may be changed. For example, letters as such "START CLUTCH LEARNING", "CLUTCH LEARNING UNDER WAY", and "CLUTCH LEARNING COMPLETED" may be displayed or announced. In essence, it is only necessary to inform the driver that the learning activity is completed. The warning unit such as a light may be used for only warning or other purposes as well.

As has been described above, with the clutch control unit according to the invention, the driver is able to learn whether the learning activity is under way or completed so that he is encouraged to complete the learning activity.

We claim:

1. A clutch control unit comprising:
   a clutch;
   a first detector for detecting a first rate of rotation of an input of said clutch;
   a second detector for detecting a second rate of rotation of an output of said clutch;
   clutch learning means for determining a clutch position at which both of said first and second rates of rotation meet predetermined conditions when said clutch is moved toward engagement from a preset learning starting point and storing a clutch characteristic;
   signal generator means for generating a learning underway signal indicating that said clutch learning means is learning said clutch characteristic; and
   warning means responsive to said learning underway signal to provide a warning display or sound.

2. The clutch control unit of claim 1, wherein said signal generator means is provided within said clutch learning means and operable based on an output of said clutch learning means.

3. The clutch control unit of claim 1, wherein said signal generator means generates a learning start signal for reminding the driver of a clutch learning activity before generating said learning underway signal and generates a learning completion signal after said learning underway signal.

4. The clutch control unit of claim 3, wherein said warning means has a light which goes off in response to said learning start signal, flashes in response to said learning underway signal, and goes on in response to said learning completion signal.

5. The clutch control unit of claim 3, wherein said warning means generates predetermined patterns of letters or sounds in response to said learning start, learning underway, and learning completion signals, respectively.

* * * * *